United States Patent

Jokic

[11] Patent Number: 5,816,667
[45] Date of Patent: Oct. 6, 1998

[54] METHOD OF CONTROLLING THE BRAKING PRESSURE AS A FUNCTION OF THE RATE OF PEDAL ACTUATION

[75] Inventor: Mile Jokic, Frankfurt am Main, Germany

[73] Assignee: ITT Manufacturing Enterprises Inc., Wilmington, Del.

[21] Appl. No.: 793,641

[22] PCT Filed: Jul. 28, 1995

[86] PCT No.: PCT/EP95/02997

§ 371 Date: Feb. 27, 1997

§ 102(e) Date: Feb. 27, 1997

[87] PCT Pub. No.: WO96/06763

PCT Pub. Date: Mar. 7, 1996

[30] Foreign Application Priority Data

Aug. 27, 1994 [DE] Germany .......................... 44 30 461.7

[51] Int. Cl.⁶ ................ B60T 8/34; B60T 8/32; B60T 7/12; B60T 13/66
[52] U.S. Cl. ............. 303/113.4; 303/155; 303/166; 303/3; 303/114.3
[58] Field of Search ............. 303/3, 113.4, 125, 303/155, 166, 114.3, 114.1, 114.2, DIG. 3, DIG. 4, 135; 701/59, 70, 71, 78; 188/356, 357

[56] References Cited

U.S. PATENT DOCUMENTS

| | | | |
|---|---|---|---|
| 4,678,243 | 7/1987 | Leiber | 303/113.4 |
| 4,826,255 | 5/1989 | Volz | 303/113.4 |
| 5,146,408 | 9/1992 | Valentic | 303/155 |
| 5,158,343 | 10/1992 | Reichelt et al. | 303/113.4 |
| 5,401,084 | 3/1995 | Volz | 303/113.4 |
| 5,441,335 | 8/1995 | Stumpe et al. | 303/113.4 |
| 5,445,444 | 8/1995 | Rump et al. | 303/113.4 |
| 5,505,526 | 4/1996 | Michels | 303/155 |
| 5,513,906 | 5/1996 | Steiner | 303/113.4 |
| 5,535,123 | 7/1996 | Rump et al. | 303/155 |
| 5,584,542 | 12/1996 | Karer et al. | 303/155 |
| 5,660,448 | 8/1997 | Kiesewetter et al. | 303/155 |
| 5,669,676 | 9/1997 | Rump et al. | 701/70 |
| 5,719,769 | 2/1998 | Brugger et al. | 303/155 |

FOREIGN PATENT DOCUMENTS

| | | |
|---|---|---|
| 4003957 | 8/1991 | Germany . |
| 4028290 | 1/1992 | Germany . |
| 4102497 | 5/1992 | Germany . |
| 4208496 | 8/1993 | Germany . |
| 4234041 | 3/1994 | Germany . |
| 4329139 | 7/1994 | Germany . |
| 4325940 | 12/1994 | Germany . |
| 4338068 | 3/1995 | Germany . |
| 4413172 | 3/1995 | Germany . |
| WO9324353 | 12/1993 | WIPO . |
| WO9411226 | 5/1994 | WIPO . |

OTHER PUBLICATIONS

English Translation of the International Preliminary Examination Report for Application No. PCT/EP95/02997 filed Jul. 28, 1995.

Search Report of the German Patent Office for Application P4430461.7.

*Primary Examiner*—Douglas C. Butler
*Attorney, Agent, or Firm*—J. Gordon Lewis; Thomas N. Twomey

[57] ABSTRACT

In a method of controlling the braking pressure as a function of the rate of pedal actuation, by way of a braking pressure generator which is driven by an independent force when an actuation threshold is exceeded, the actual values of the pedal travel and the vehicle deceleration or the braking pressure are determined during partial braking operations, and the actual values are compared with the nominal values or series mean values. Correction factors are derived from the respective deviation of the actual values from the nominal values, and an adaptation factor is determined in a learning process over successive partial braking operations. To determine the actuation threshold, the basic value of the threshold is multiplied by the adaptation factor.

7 Claims, 2 Drawing Sheets

METHOD OF CONTROLLING THE BRAKING PRESSURE AS A FUNCTION OF THE RATE OF PEDAL ACTUATION

BACKGROUND OF THE INVENTION

The present invention relates to a method of controlling the braking pressure of an automotive vehicle brake system as a function of the rate of pedal actuation, by way of a braking pressure generator which is driven by an independent force when an actuation threshold is exceeded.

German patent No. 40 28 290 discloses a method of shortening the stopping distance in critical driving situations. In this method, an independent force causes an increase in braking pressure as soon as the rate of pedal actuation exceeds a threshold value. Cases are likely where the driver depresses the pedal at a high rate during panic braking or emergency stopping, but exerts only insufficient force on the pedal. Therefore, the driver is assisted by the independent force in this situation, whereby a brake force is caused which is in excess of the brake force that would correspond to the pedal force during normal pedal actuation.

It must be ensured for obvious reasons that the independent force does not occur inadvertently because an undesirably great deceleration of the vehicle involving a risk of rear-end collision for the following vehicle would be caused.

On the one hand, the actuation threshold of the independent force should be so low that the threshold is exceeded with certainty in an emergency situation, even by a rather weak driver. On the other hand, the threshold should be so high as to prevent inadvertent actuation of the independent force. These contrary requirements are difficult to satisfy especially because the pedal actuation characteristics of a vehicle depends on manufacturing tolerances of the individual components and, also, on the condition of the brake system and the brake fluid.

SUMMARY OF THE INVENTION

Therefore, an object of the present invention is to provide a method permitting a maximum precise adjustment of and adherence to the actuation threshold.

It has been found that this object may be achieved by the method described in claim 1. The special features of the method of the present invention involve that the actuation threshold is defined by a basic value which is responsive to pedal speed, and by factors which are responsive to the vehicle speed and the pedal travel, that the actual values of the pedal travel and/or the vehicle deceleration and/or the braking pressure are determined in partial braking operations, that the actual values are compared with nominal values, such as preset standards, series mean values, etc., that correction factors are determined from the respective difference between the actual values and the nominal values, that an adaptation factor is calculated in a learning process over successive partial braking operations, and that the basic value is additionally multiplied by the adaptation factor to determine the actuation threshold.

Thus, the pedal actuation characteristics is set to a predefined behavior or a series mean value in a learning process according to the present invention. The decisive factors which previously influenced the pedal characteristics, such as venting condition of the brake system (air in the system),
lining quality (soft, hard),
lost travel,
effects of age and wear,
volume absorption of the hydraulic consumers, and
manufacturing tolerances lose significance, are compensated for, or greatly reduced in their effect.

It is possible to adjust the actuation threshold relatively exactly to the above-mentioned compromise value which satisfies drivers with different habits of pedal actuation.

In a preferred aspect of the present invention, the actual values of the pedal travel and the acceleration are measured during the individual partial braking operations, the actual value of pedal travel is compared with the nominal value of the vehicle deceleration or the nominal value of the braking pressure, and a correction factor is derived from the nominal and actual values.

Further, in an aspect of the method of the present invention, the adaptation factor is determined by calculating a mean value over successive partial braking operations where the pedal travel and/or the vehicle deceleration exceed a predetermined minimum value.

It is expedient to determine the correction factors by comparison of the actual values with nominal values stored in tables, for example, in the read-only memory of a microcontroller.

In another aspect of the present invention, test values defined by plausibility considerations are excluded during the learning process. Thus, it is expedient to disregard extraordinary test values, such as values influenced by uphill or downhill driving or by control operations (which naturally differ from the normal values or mean values), in the learning process of the adaptation factor during the mean value calculation for determining the adaptation factor.

In still another aspect of the method of the present invention, the rate of pedal actuation (when a braking pressure generator with a vacuum brake power booster is used) is determined by a sensor which measures the diaphragm displacement travel of the booster.

Further details of the present invention can be seen in the following description, making reference to the accompanying drawings.

DETAILED DESCRIPTION OF THE INVENTION

Figure 1:
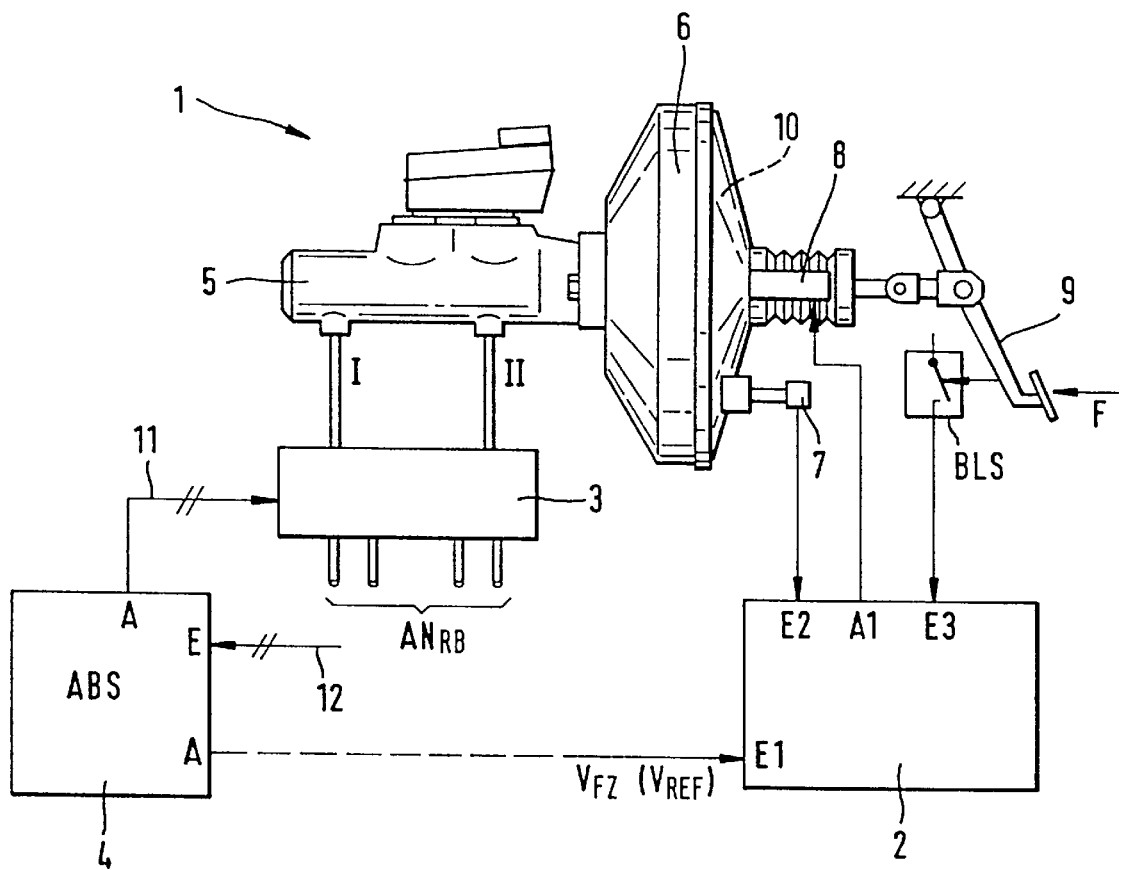
FIG. 1 is a schematic view of the most important components of a brake system for implementing the method of the present invention.

In the embodiment of the present invention of FIG. 1, the brake system substantially includes a pedal-operated braking pressure generator 1, an electronic control unit 2, a valve block 3 and a control unit 4. Components 1 and 2 are required to implement the method of the present invention. The use of components 3 and 4, which extend the brake system to an anti-lock control system (ABS), is only appropriate because a brake system including an actuation by independent force is expediently rated so that the locking limit is reached during actuation by independent force.

The braking pressure generator 1 includes a tandem master cylinder 5 with a vacuum brake power booster 6 connected upstream of the master cylinder. In the present case, the pedal travel is sensed by a diaphragm displacement travel sensor 7 which generates an electric signal indicative of the covered pedal travel and conducts it to the electronic control unit 2. An electromechanically operable valve 8 is provided at the inlet of the vacuum brake power booster 6. Actuation of valve 8 causes an independent force which acts in the same direction as the pedal force F applied to a pedal 9. For the actuation of the independent force, a connection is provided by way of the valve from the atmosphere to a vacuum chamber 10 of the brake power booster 6, with the result that a force is exerted in a known fashion on the pistons (not shown) of the master cylinder 5. The pistons generate the desired braking pressure in the brake circuits I, II of the brake system.

Further, the embodiment of FIG. 1 represents a brake actuation switch or brake light switch BLS, the output signal of which is also conducted to the control unit 2 by way of an input E3. Switch BLS is used to ensure and monitor individual functions of the brake system.

The rate of pedal actuation $v_{Ped}$ is derived from the output signals of the diaphragm displacement travel sensor 7 by the electronics of the control unit 2.

Further, the vehicle speed $V_{FZ}$ or a vehicle reference speed $V_{REF}$ is signalled to the control unit 2 by way of an input E1. The signal can be taken directly from the ABS control unit 4 (as indicated in broken lines) in installations equipped with ABS systems.

The valve block 3, to which the wheel brakes are connected by way of the indicated ports $AN_{RB}$, is used for the braking pressure modulation during anti-lock control operations. The valves are controlled by the ABS control unit 4 by way of a gathering line 11. Input signals to produce braking pressure control signals are conducted to the ABS control unit 4 by way of a multiple line 12. As is known, important input data for an ABS control unit are provided by speed sensors on each individual wheel.

Master cylinder 5 and brake power booster 6 in FIG. 1 operate in a conventional manner during partial braking operations, i.e., during braking operations without response of the control.

The exceeding of a defined pedal speed or rate of pedal actuation is a criterion for panic braking or emergency stops. When an actuation threshold is exceeded, actuation by independent force commences because the electromechanic valve 8 is actuated by way of output A1 of the control unit 2. This causes pressure balance in the vacuum chamber 10 of the vacuum brake power booster 6 and maximum output of the brake power booster 6. After the actuation threshold has been reached, braking pressure is built up in the brake circuits I, II of the brake system which is not proportional to the pedal force F but exceeds the pressure which corresponds to the pedal force F. Consequently, inadvertent exceeding of the actuation threshold, although only a partial braking operation was intended, may cause dangerous traffic situations.

Figure 2A:
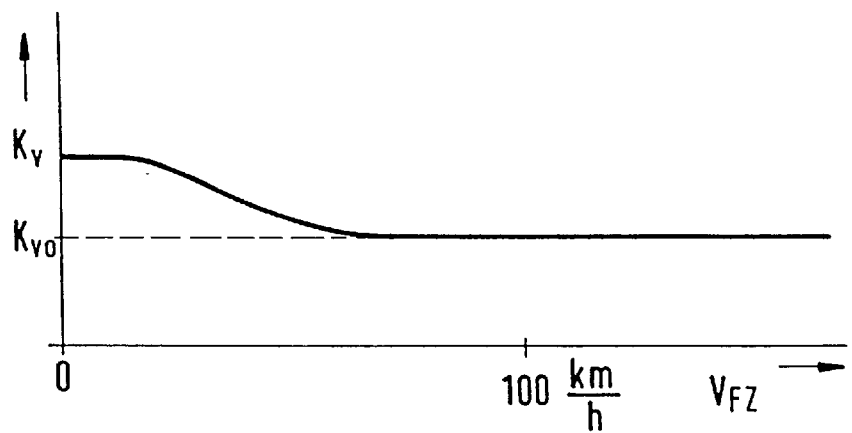
FIG. 2A, 2B and 2C show diagrams to illustrate the operation of the brake system of FIG. 1.
Figure 2B:
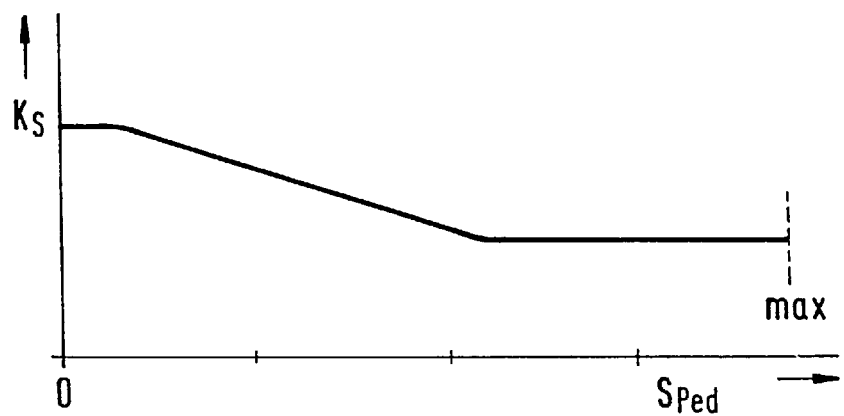

The actuation threshold, i.e., the speed value of the pedal actuation, at the attaining or exceeding of which value the actuation by independent force commences, is defined by a basic value GW which is multiplied by a factor $K_V$ responsive to the vehicle speed, and by a factor $K_S$ responsive to the pedal position or diaphragm position. FIG. 2A shows the principal variation of the factor $K_V$ responsive to vehicle speed, and FIG. 2B shows the variation of the factor $K_S$ as a function of the diaphragm displacement travel. A linear scale was chosen for all quantities in the curves of FIGS. 2A and 2B.

In FIG. 2A, the factor $K_v$ is relatively high at low speed, decreases with rising speed and, finally, adopts a constant value $K_{VO}$ starting from a predetermined speed threshold.

The factor which is responsive to the diaphragm or pedal position $S_{Ped}$ has a similar pattern. At the commencement of pedal displacement, the factor $K_S$ is relatively high and increases with continuing pedal displacement. Factor $K_S$ adopts a constant value after a defined pedal position is reached.

Figure 2C:
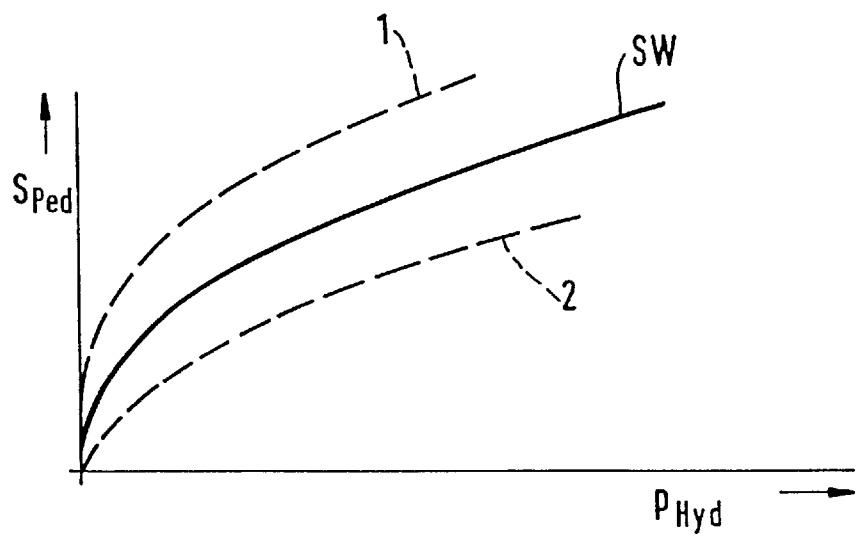

However, the rate of pedal actuation or diaphragm displacement $V_{Ped}$ actually caused by a defined pedal force F depends to a great degree on the pedal actuation characteristics which influences the 'pedal feel'. With the vehicle and the brake system identical, however, the pedal actuation characteristics is dictated by the respective brake adjustment, by manufacturing tolerances, lost travel, lining quality, etc., and more particularly by the operating condition of the brake system. Insufficient venting of the brake system has a major effect. Deviations from desired values of the pedal actuation characteristics, i.e., from the nominal values or series mean values, are considerable. FIG. 2C representing the pedal travel $S_{Ped}$ as a function of the hydraulic pressure $p_{Hyd}$ in the brake system illustrates the tolerances occurring in practical operations. The mean uninterrupted characteristic curve relates to the nominal value or series mean value. The dotted upper curve 1 represents a brake with a 'soft' pedal feel, and the lower dotted curve 2 represents a brake system with a 'hard' pedal actuation characteristics. In comparison to the nominal value of curve SW, the pattern of the brake in curve I indicates an unfavorable operating condition, air in the brake system or any other disadvantageous effects. A brake system exhibiting the pattern of curve 2 is above the quality standard according to the series mean value or nominal value SW.

The method according to the present invention permits compensating for, or at least reducing, manufacturing tolerances and adverse effects which cause great discrepancies of the pedal actuation characteristics from the nominal value. To this end, the actual pedal value $S_{Ist}$ is measured by the pedal travel sensor or diaphragm displacement travel sensor 7 during each partial braking operation. Further, the deceleration $A_{Ist}$ of the vehicle achieved during the braking operation is calculated from the vehicle speed and the timely variation thereof. The deceleration $a_{Ist}$ indicates a defined braking pressure $p_{Ist}$. A correction factor is determined by comparison of the actual values with the nominal values to represent the difference between the actual values and the nominal values. The basic value GW determining the actuation threshold (or the product of the basic value and the factors $K_V$ and $K_S$) is multiplied by the correction factor, with the result that the actuation threshold is displaced in the way desired. An adaptation factor $A_K$ is produced in a learning process on the basis of the measurements and comparisons between the nominal and actual values during the individual partial braking operations, for example, by calculating a mean value over a defined number of successive partial braking operations.

One possibility of producing the correction factor includes measuring the actual value of the pedal position or the diaphragm position $S_{Ist}$ by way of travel sensor 7, comparing the actual value $S_{Ist}$ with the associated nominal value of the braking pressure or the nominal value of the deceleration $a_{Soll}$ and, finally, putting the nominal value $a_{Soll}$ in relation with the actual value of the vehicle deceleration which may be determined by a time derivative of the vehicle speed. The correction factor $F_{K1}$ is determined by the relation $$F_{K1}=a_{Soll}/a_{Ist}.$$

The correction factor could als be defined correspondingly by the relation $F'_{K1} = p_{Soll}/p_{Ist}$.

$p_{Soll}$ is the expected hydraulic braking pressure, and $p_{Ist}$ is the actually measured braking pressure or braking pressure calculated from the actual vehicle deceleration.

On the other hand, it should also be possible to define the correction factor $F_{K2}$ by the relation $F_{K2} = S_{Ist}/S_{Soll}$, wherein $s_{soll}$ can be determined by a tabulated correlation of the nominal braking pressure or the nominal vehicle deceleration to the actual pedal travel $s_{Ist}$.

Because the individual partial braking operations differ from each other by superimposed effects, such as small road downgrades or uphill grades, varying pedal forces, non-linearities, etc., it is necessary to produce mean values from the single braking operations or measuring operations or the respectively calculated correction factors, and to then derive the adaptation factor $A_K$ from the mean values in a learning process. For example, reasonable correction values may already be derived by producing mean values over five "normal" partial braking operations. "Normal" refers to braking operations performed when the vehicle moves on a roughly plane road surface. Special cases, such as uphill or downhill driving, which might cause misinterpretations in the comparison of the actual values with the nominal values, are prevented by plausibility considerations in the calculation of the correction and adaptation factors and the calculation of mean values.

The previously defined correction factor $F_{K1}$, $F'_{K1}$, $F_{K2}$ indicates the condition of the brake system and the deviation from the nominal values or series mean values. Of course, this also applies to the adaptation factor determined, for example, from the correction factors by averaging. If the factor $F_K=1$ in the present case, the brake system corresponds to the series mean value. If $F_K>1$, the system is comparatively simple and involves a soft pedal feel. With $F_K<1$, the system and its operating condition are above average.

The learning process may be performed in varying fashions depending of the type of vehicle and the desired pedal actuation characteristics. It is possible to start the learning process only after a defined number of partial braking operations. The learning process may commence newly with each start of the ignition of the vehicle motor, or it may be based on the previously acquired value. It is deemed appropriate in any case to carry out the correction of the initial actuation threshold by the acquired correction and adaptation factor in relatively small steps which are imperceptible to, or at least not disturbing, the driver.

The calculation of the correction and adaptation factors in the control unit 2 may be achieved by electronic hardware or, as is conventional nowadays, by data processing, for example, by a microcontroller. Both possibilities and mixed arrangements are available to the expert.

It is claimed:

1. A method of controlling a braking pressure of an automotive vehicle brake system as a function of a rate of pedal actuation, by way of a braking pressure generator which is driven by an independent force when an actuation threshold is exceeded, the actuation threshold being defined by a threshold value or basic value which is responsive to pedal speed, and by factors which are responsive to a predetermined vehicle speed and pedal travel, comprising the steps of:

determining actual values for at least one of the pedal travel, a vehicle deceleration and a braking pressure during partial braking operations, comparing the actual values with corresponding nominal values, determining correction factors based on respective differences between the actual values and the corresponding nominal values, calculating an adaptation factor during a learning process over successive partial braking operations, determining the actuation threshold by multiplying the basic value by the adaptation factor, and controlling a braking pressure as a function of said actuation threshold.

2. The method of claim 1, further comprising measuring the actual values of the pedal travel and the vehicle deceleration during the partial braking operations, comparing the actual value of the pedal travel with the nominal value of the vehicle deceleration or the nominal value of the braking pressure $p_{Soll}$, and determining a correction factor $F_{K1}$, $F_{K1}$ according to the relation $F_{K1} = a_{Soll}/a_{Ist}$ or $F_{K1} = P_{Soll}/P_{Ist}$, wherein $a_{Soll}$ is the nominal value of the vehicle deceleration.

$a_{Ist}$ is the actual value of the vehicle deceleration.

$P_{Soll}$ is the nominal braking pressure, $P_{Ist}$ is the actual braking pressure.

3. The method of claim 1, further comprising calculating the actual values of the pedal travel $S_{Ist}$ or the deceleration or the braking pressure during the partial braking operations, comparing the actual value of the vehicle deceleration or the braking pressure with the nominal value of the pedal travel $s_{Soll}$, and determining a correction factor $F_{K2}$ according to the relation $F_{K2} = s_{Ist}/s_{soll}$.

4. The method of claim 1, further comprising determining the adaptation factor by calculating a mean value over successive partial braking operations, where the pedal travel or the vehicle deceleration exceeds predetermined minimum values.

5. The method of claim 1, further comprising determining the correction factors by comparison of the actual values with the corresponding nominal values stored in tables.

6. The method of claim 1, further comprising excluding extraordinary test values from the learning process or the mean value calculation for determining the adaptation factor.

7. The method of claim 1, further comprising determining the rate of pedal actuation when using a braking pressure generator equipped with a vacuum brake power booster by sensing the diaphragm displacement travel of the brake power booster.

* * * * *